（12）United States Patent
Ishinabe et al.

(10) Patent No.: US 6,295,174 B1
(45) Date of Patent: Sep. 25, 2001

(54) REFLECTIVE PRISM DEVICE

(75) Inventors: Ikuo Ishinabe; Hiromitsu Takaya, both of Tokyo-to (JP)

(73) Assignee: Kabushiki Kaisha Topcon, Tokyo-To (JP)

( * ) Notice: Subject to any disclaimer, the term of this patent is extended or adjusted under 35 U.S.C. 154(b) by 0 days.

(21) Appl. No.: 09/501,198

(22) Filed: Feb. 10, 2000

(30) Foreign Application Priority Data

Feb. 16, 1999 (JP) .................................................. 11-037002

(51) Int. Cl.[7] .............................. G02B 5/04; G02B 5/122; H04B 10/00; H04B 10/06; G01C 15/02
(52) U.S. Cl. ........................ 359/834; 359/529; 359/170; 359/195; 33/293
(58) Field of Search ........................................... 359/831, 834, 359/529, 195, 173, 170, 159, 155; 356/5.01–5.15, 4.08, 141.1; 33/293, 294, 295

(56) References Cited

U.S. PATENT DOCUMENTS

| | | | |
|---|---|---|---|
| 5,008,527 | * | 4/1991 | Wilk ...................................... 359/529 |
| 5,051,934 | | 9/1991 | Wiklund ................................ 364/561 |

FOREIGN PATENT DOCUMENTS 623 131    5/1981   (CH) .

* cited by examiner

*Primary Examiner*—Cassandra Spyrou
*Assistant Examiner*—Jared Treas
(74) *Attorney, Agent, or Firm*—Nields & Lemack

(57) ABSTRACT

The present invention provides a reflective prism device, which comprises a prism unit and a data communication unit, and communication light being irradiated from a survey instrument toward said prism unit, whereby there is provided a light guide for guiding a part of said communication light entering said prism unit toward said data communication unit.

3 Claims, 6 Drawing Sheets

FIG. I

REFLECTIVE PRISM DEVICE

BACKGROUND OF THE INVENTION

The present invention relates to a reflective prism device for receiving a light beam emitted from a device such as a survey instrument and for reflecting it toward the survey instrument. The invention relates, in particular, to a reflective prism device with a function to perform optical communications, in which communication data is synthesized in the light beam from the survey instrument.

In a survey instrument, in particular, in a theodolite, there has been a trend in recent years that the system for reading angle measurement data has been changed from an optical reading system to an electrical reading system. Further, an electronic survey instrument incorporated with light wave distance measuring function is now the main stream in this field. In such new type of survey instruments, a light beam for measurement, i.e. range-finding light, is projected to a prism device, which is a target object, and distance is measured according to the range-finding light reflected from the prism device. Some of the survey instruments for light wave distance measurement used in recent years are provided with an optical communication device in which data for communication is synthesized with the range-finding light to be projected, and various types of information such as data for working instructions, measurement result, etc. are transmitted to a reflective prism device from the survey instrument.

FIG. 10 represents the electronic survey instrument as described above and a reflective prism device provided with a reflective prism, and it shows how survey operation is performed to determine a setting point.

In this figure, reference numeral 1 represents an electronic survey instrument installed at a known point, and a reflective prism device 2 for the survey instrument 1 is erected at a setting point. The electronic survey instrument 1 is incorporated with means for electrically reading angle measurement data and also with light wave survey means for surveying operation using light wave of range-finding light. Also, the reflective prism device 2 comprises a prism unit 3 and a data communication unit 4, which reflect a range-finding light 5 toward the survey instrument 1.

From the survey instrument 1, the reflective prism device 2 is collimated, and angle measurement and distance measurement are performed. The range-finding light 5 emitted from the survey instrument 1 is reflected by the prism unit 3 of the reflective prism device 2. The survey instrument 1 receives the reflected range-finding light, and the distance is measured. Distance measurement is performed by several tens of times in a second, for example, and the mean value is calculated as the measured value. If the measured value is different from the desired setting value, an instruction to change position is transmitted to an operator who is positioned on the side of the reflective prism device 2.

The instruction to change position is given via the range-finding light 5. Survey data such as measured distance, measured angle, etc. obtained at the survey instrument 1 or data relating to the setting position based on the survey data, e.g. information on the instruction to change position such as moving in rightward direction, for example, is synthesized in the range-finding light 5 by modulating the range-finding light 5. The range-finding light 5 is transmitted to the reflective prism device 2 as a light beam, which also serves as communication light.

The data communication unit 4 receives the range-finding light 5, and the information synthesized in the range-finding light 5 is separated and displayed. Or, communication is transmitted from the data communication unit 4 to the survey instrument 1 when necessary.

FIG. 11 shows a schematic optical arrangement of the survey instrument 1 and the reflective prism device 2. Brief description will be given now on an optical system comprising the survey instrument 1 and the reflective prism device 2.

The optical system for irradiating and receiving the range-finding light comprises a light source 10 for emitting the range-finding light 5, an irradiating optical system for irradiating the range-finding light 5 from the light source 10 to the reflective prism device 2, a photodetection optical system for guiding the reflection light from the reflective prism device 2, and a photodetection element 13 for receiving the reflection light guided by the photodetection optical system.

The range-finding light 5 from the light source 10 is reflected by a reflection mirror 11 and is directed toward an objective lens 12, which serves as the irradiating optical system. After being turned to approximately parallel beams by the objective lens 12, the range-finding light 5 is projected toward the prism unit 3 of the reflective prism device 2, and it is reflected by the prism unit 3. The reflected range-finding light 5' is directed again toward the objective lens 12. As shown in the figure, the prism unit 3 of the reflective prism device 2 comprises a corner cube, which serves as a retroreflective prism, and a reflection sheet, etc.

After passing through the objective lens 12, the reflected range-finding light 5' is focused by the objective lens 12, and it is deviated from the optical axis of the light source 10 as it is reflected by the reflection mirror 11, and an image is formed on the photodetection element 13.

As it is evident from FIG. 10, in the reflective prism device 2, the prism unit 3 and the data communication unit 4 are aligned in parallel in left-to-right direction or updown direction. In particular, when the data communication unit 4 is mounted after the prism unit, it is arranged in parallel to the prism unit.

The range-finding light 5 is irradiated as the approximately parallel light beams, and the use of parallel beams makes it possible to measure long distance. As described above, the prism unit 3 and the data communication unit 4 are arranged in parallel, and these cannot be disposed on the same optical axis. In general, the range-finding light is irradiated as parallel beams. Because the reflective prism device 2 is installed at long distance, the beams are spread over a certain angle although the beams are called "parallel beams". The spreading of light beams or luminous fluxes covers the prism unit and the data communication unit which are arranged in parallel, and the range-finding light 5 is projected to the prism unit and the data communication unit.

However, there is almost no spreading of luminous fluxes in case of near distance survey operation, and a problem arises in that the range-finding light 5 cannot cover the data communication unit, which is arranged in parallel to the prism unit when the prism unit is collimated. This leads to the situation that information cannot be transmitted via optical communications in case of near distance survey operation.

SUMMARY OF THE INVENTION

It is an object of the present invention to provide a reflective prism device, by which it is possible to perform data communication between a survey instrument 1 and a reflective prism device 2 in a satisfactory manner even in the near distance survey operation where there is no spreading of luminous fluxes of the range-finding light.

The reflective prism device according to the present invention comprises a prism unit and a data communication unit, and communication light being irradiated from a survey instrument toward the prism unit, wherein there is provided a light guide for guiding a part of the communication light entering the prism unit toward the data communication unit. The present invention also provides the reflective prism device as described above, wherein the data communication unit comprises at least a photodetection unit for receiving communication light and an operation unit which have a signal detection circuit for detecting communication data from the communication light based on a photodetection signal of the photodetection unit and a display unit for displaying the communication data detected by the signal detection circuit. Further, the present invention provides the reflective prism device as described above, wherein the data communication unit comprises a photodetection unit and an operation unit, and the photodetection unit and the operation unit are separated from each other. Also, the present invention provides the reflective prism device as described above, wherein there is provided a switching mechanism for changing photoreceiving position of the light guide and for guiding communication light from different position of the prism unit toward the data communication unit. Further, the present invention provides the reflective prism device as described above, wherein the light guide comprises a first reflection surface for reflecting incident communication light, a columnar optical member for guiding range-finding light from the first reflection surface, and a second reflection surface for reflecting the communication light from the columnar optical member toward the photodetection unit. Also, the present invention provides the reflective prism device as described above, wherein the switching mechanism switches over photodetecting position of the light guide to at least upper or lower position of the prism unit. Further, the present invention provides the reflective prism device as described above, wherein the light guide is a planar optical member for covering a photodetection surface of the prism unit and a photodetection window of the data communication unit, a reflection surface crossing the photodetection surface and a reflection surface crossing the photodetection window at opposite position to the reflection surface are formed on the optical member, and a part of the light irradiated to the light guide is guided toward the data communication unit as communication light by reflection of the reflection surfaces.

DETAILED DESCRIPTION OF THE PREFERRED EMBODIMENTS

In the following, description will be given on embodiments of the present invention referring to the attached drawings.

Figure 1:
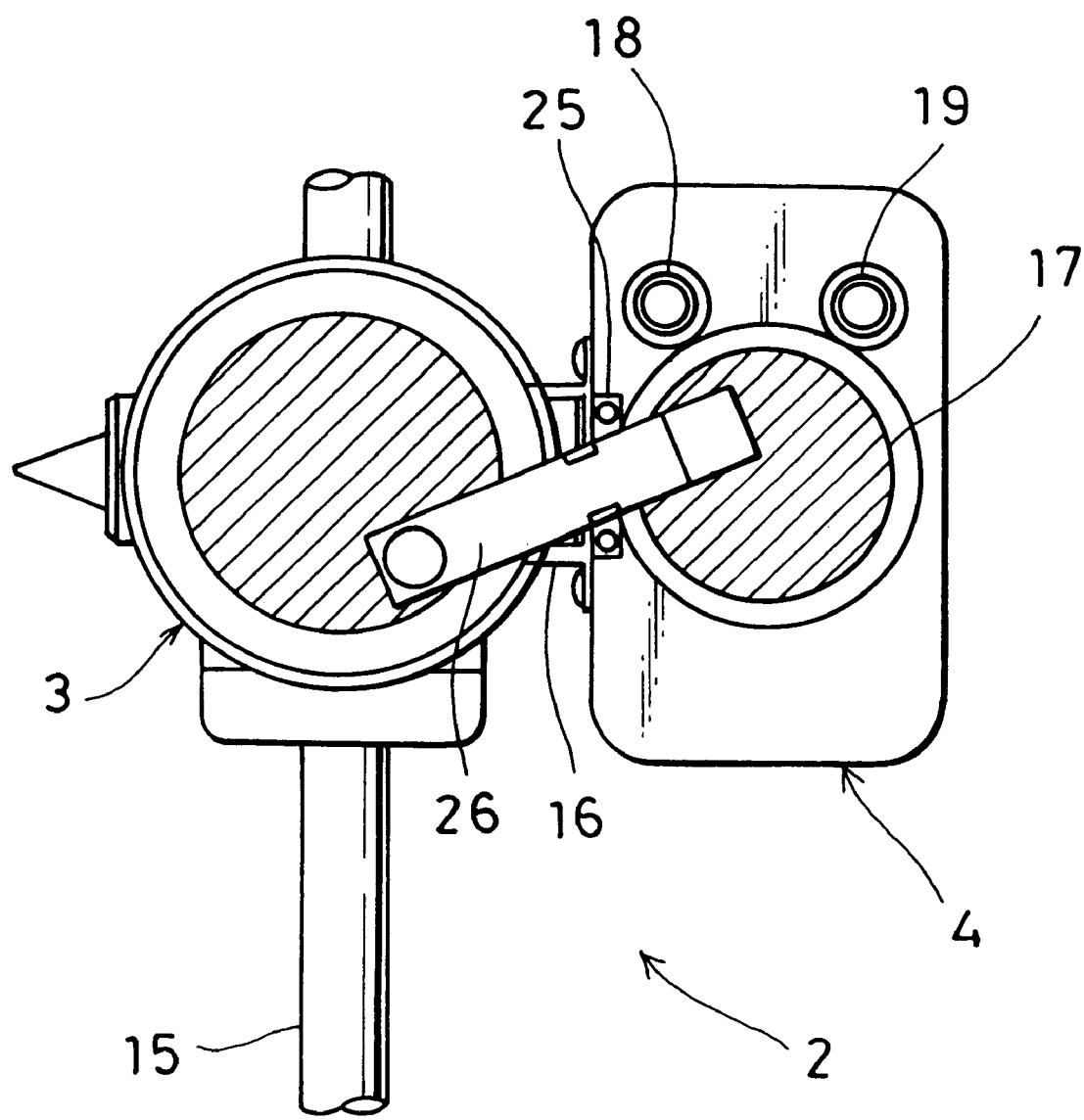
FIG. 1 is a front view of an embodiment of the present invention.
Figure 2:
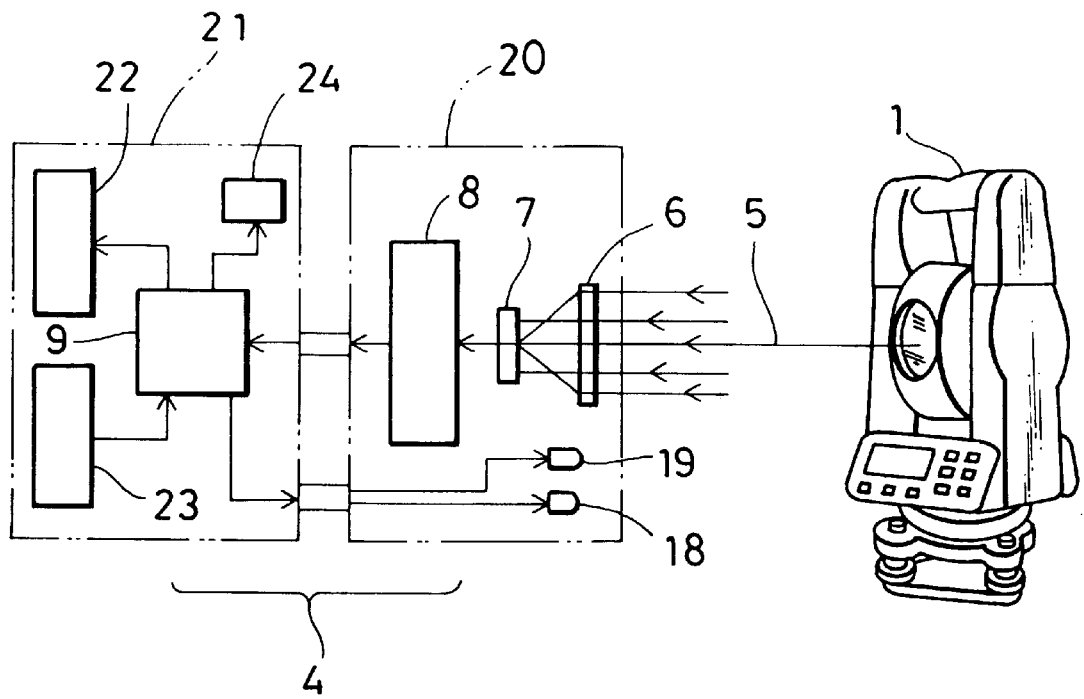
FIG. 2 is a schematical block diagram of a data communication unit of the above embodiment.
Figure 10:
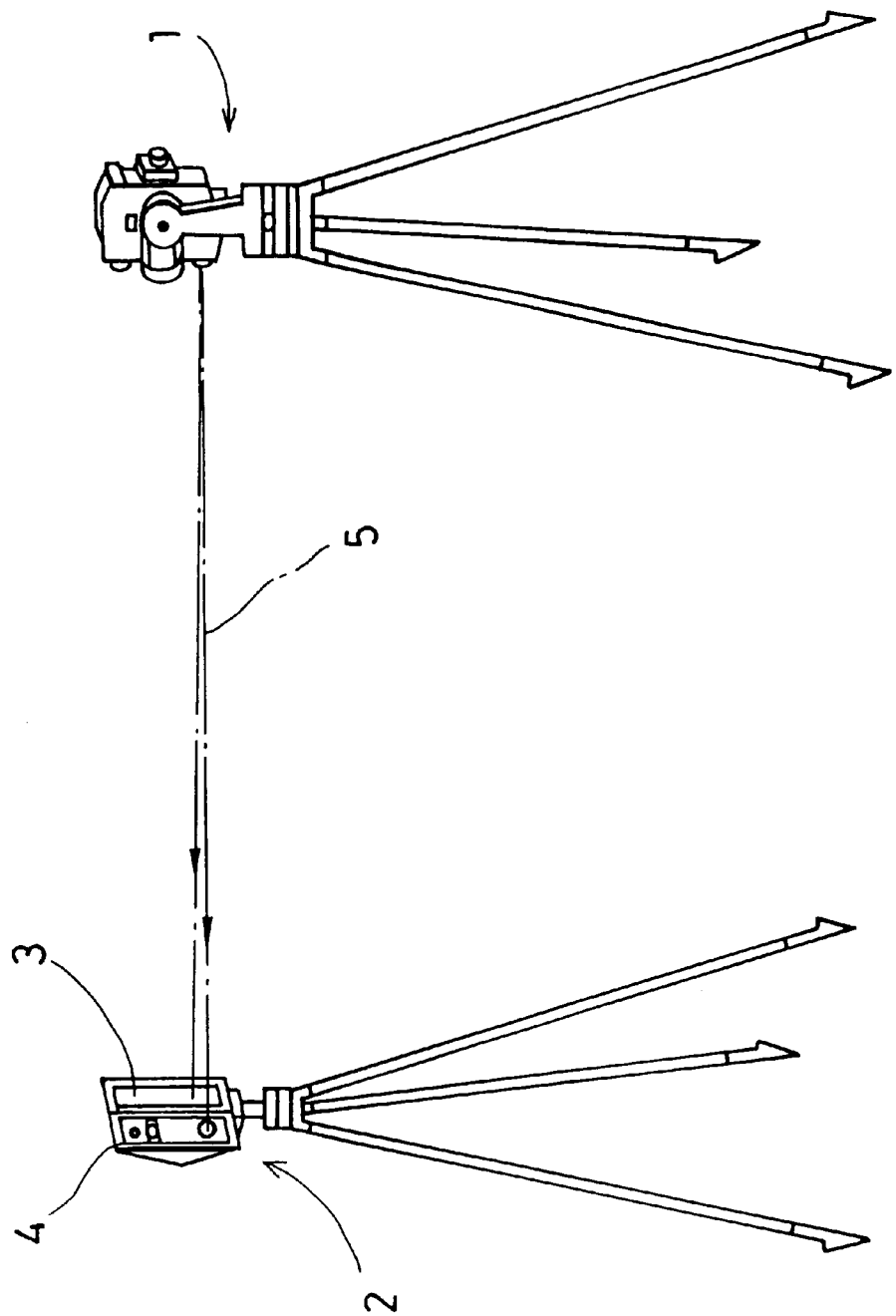
FIG. 10 is a general view of the survey instrument and the reflective prism device.

In FIG. 1 and FIG. 2, the same components as shown in FIG. 10 is referred by the same symbol.

A prism unit 3 is slidably engaged with a pole 15, and a data communication unit 4 is mounted at a position adjacent to the prism unit 3 via a support 16. The data communication unit 4 may be integrally designed with the prism unit 3 or it may be removably arranged with respect to the prism unit 3.

A switching mechanism 25 is mounted on the data communication unit 4, and a light guide 26 is mounted on the data communication unit 4 via the switching mechanism 25. The switching mechanism 25 rotatably supports the light guide 26 so that the light guide 26 can be held at two rotating positions by holding power as required. The light guide 26 guides a part of light beams entering the prism unit 3 toward the data communication unit 4.

A photodetection window 17 is arranged on the front surface of the data communication unit 4, and optical axis of the photodetection window 17 is on the same horizontal plane as the optical axis of the prism unit 3. On the front surface of the data communication unit 4, photodetection confirming light emitting elements 18 and 19 for judging and confirming whether the data has been received or not are disposed. One of the photodetection confirming light emitting elements 18 and 19, i.e. the photodetection confirming light emitting element 18, is an LED which is lighted up in red color and shows photodetection state. The other photodetection confirming light emitting element 19 is an LED which is lighted up in orange color and shows non-photodetection state.

Figure 3:
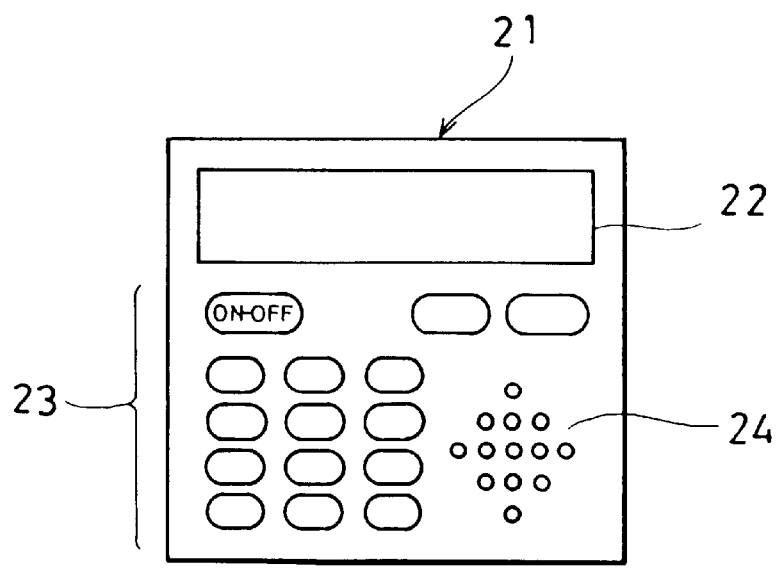
FIG. 3 is a front view of an example of an operation unit used in the above embodiment.

FIG. 2 is a schematical block diagram of the data communication unit 4, and FIG. 3 shows an example of an operation unit.

The data communication unit 4 mainly comprises a photodetection unit 20 and an operation unit 21. The photodetection unit 20 has photodetection optical means, which comprises a photodetection element 7, a signal detection unit 8, and a diffraction optical member 6 arranged in front of the photodetection element 7 (on the photodetection window 17). The operation unit 21 comprises an arithmetic unit 9, a display unit 22, an input unit 23 containing ten-key pad, ON-OFF switch, etc., and a speaker 24.

In FIG. 3, the operation unit 21 is shown as separated from the photodetection unit 20 and designed as a single unit, while the operation unit 21 may be integrally designed with the photodetection unit 20. When the operation unit 21 is designed as a separate unit as in the present embodiment, the pole 15 is not swung during operation, and this contributes to the improvement of maneuverability. There is also no influence on maneuverability in case the prism unit 3 is arranged at extremely upper or lower position. Further, in case survey information obtained by the operation unit 21 is to be stored in a data collector, and if the reflective prism device 2 and the data collector are separated from each other, this would be convenient when the operation unit 21 is connected with the data collector because it can be separated from the photodetection unit 20 and can be connected as a single unit.

The range-finding light 5 passes through the diffraction optical member 6 and enters the photodetection element 7. The photodetection element 7 converts the received range-finding light 5 by photoelectric conversion and outputs it as a photodetection signal to the signal detection unit 8. At the signal detection unit 8, a data signal such as a modulation signal is separated and detected among the photodetection signals, and this is outputted to the arithmetic unit 9. The arithmetic unit 9 operates the display unit 22 to display as required, e.g. a result of survey or display data on working instruction, based on the data signal. The input unit 23 switches over the display on the display unit 22 or inputs the data to be transmitted to the survey instrument 1.

The diffraction optical member 6 has function to converge light beams and also allows the parallel components of the incident luminous fluxes to pass just as they are. Therefore, when the range-finding light 5 enters the diffraction optical member 6 from oblique direction at near distance, the parallel components pass through and reach the photodetection element 7. In the case of near distance, spreading of luminous fluxes is small, and luminous flux density is high, and even when the parallel components are a part of the range-finding light 5, there is light amount enough for operation of the photodetection element 7.

Next, when the survey instrument 1 is positioned at long distance from the reflective prism device 2 and the range-finding light 5 enters the diffraction optical member 6 with luminous fluxes spreading widely, the diffraction optical member 6 converges the range-finding light 5 to photodetection a surface of the photodetection element 7. Therefore, sufficient amount of light enters the photodetection element 7 even at long distance.

Figure 4:
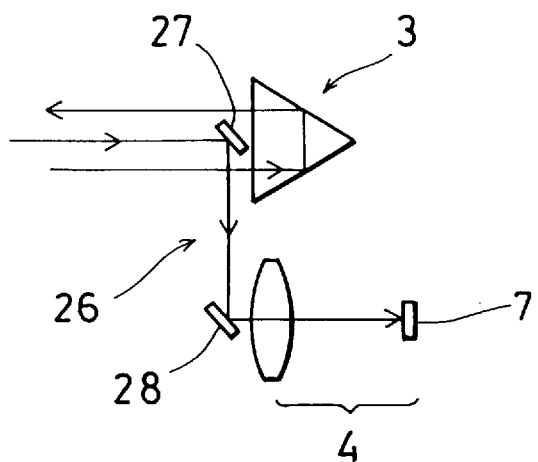
FIG. 4 is a drawing to explain optical arrangement of a prism unit and a data communication unit in a reflective prism device of the present invention.

Now, description will be given on general optical arrangement of the prism unit 3, the data communication unit 4 and the light guide 26 referring to FIG. 4. The light guide 26 is designed with such a length as to cover the photodetection surface of the prism unit 3 and the photodetection window 17. At an end closer to the prism unit 3, there is a reflection surface 27, which faces toward the survey instrument 1. At an end closer to the data communication unit 4, there is a reflection surface 28, which faces toward the photodetection window 17. Here, the light guide 26 shades the entering of the range-finding light 5 to the prism unit 3, but it is designed in such size that the decrease of light amount caused by shading does not exert an influence on the distance measurement.

Figure 8A:
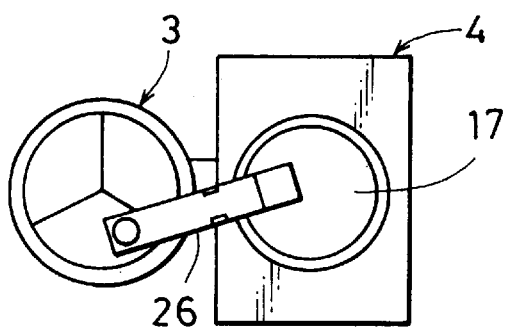
FIG. 8(A) and FIG. 8(B) each represents operation of the embodiment of the present invention.
Figure 8B:
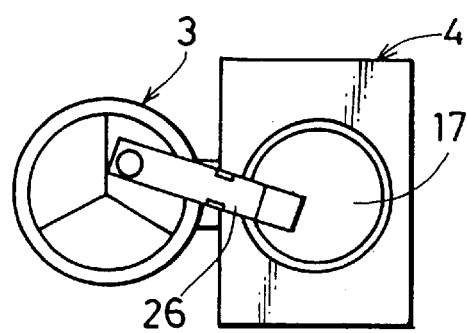

The light guide 26 is supported at two rotating positions as shown in FIG. 8(A) and FIG. 8(B), i.e. lower half and upper half of the prism unit 3.

Next, operation will be described.

When the survey instrument 1 is positioned at near distance from the reflective prism device 2, spreading of the range-finding light 5 is small, and the light is not irradiated to the data communication unit 4. The light guide 26 guides a part of the range-finding light 5 irradiated to the prism unit 3 toward the data communication unit 4. The data communication unit 4 receives a part of the range-finding light 5 as communication light and a data signal such as a modulation signal is separated and detected.

Figure 5:
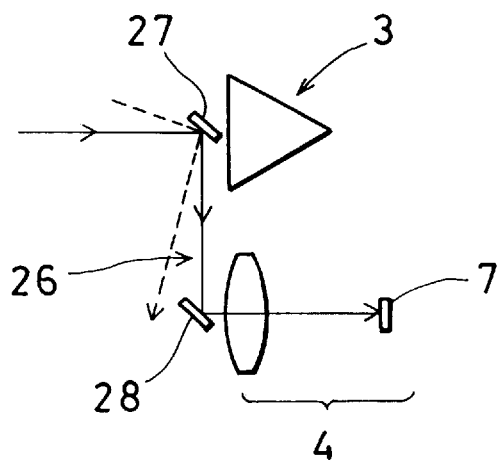
FIG. 5 is a drawing to explain optical arrangement of a prism unit and a data communication unit in a reflective prism device of the present invention.

FIG. 5 shows a case of the above embodiment when an optical axis of the range-finding light 5 entering the reflection surface 27 is tilted. When the optical axis is tilted, in order to guide properly the range-finding light 5 reflected by the reflection surface 27 toward the photodetection element 7 using the reflection surface 28, reflection areas of the reflection surfaces 27 and 28 must be considerably larger. As a result, the light guide 26 must be designed in larger size. When the reflection surface 27 is larger, the light amount of the range-finding light 5 entering the prism unit 3 decreases, and distance measurement may be adversely affected.

Figure 6:
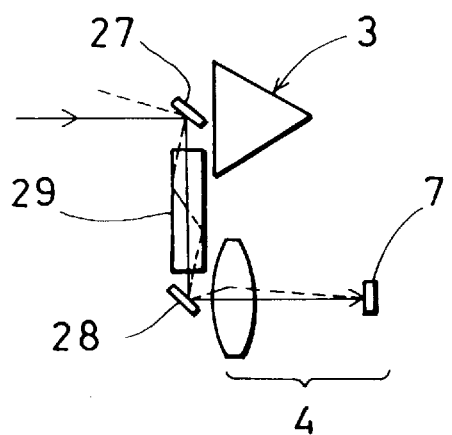
FIG. 6 is a drawing to explain optical arrangement of a prism unit and a data communication unit in a reflective prism device of the present invention.

FIG. 6 shows a case where there is provided a columnar optical member 29 between the reflection surfaces 27 and 28 so that communication light can be guided reliably toward the data communication unit 4 even when the reflection surfaces 27 and 28 are smaller. An incident end surface of the columnar optical member 29 is positioned closer to the reflection surface 27, and its exit end surface is positioned closer to the reflection surface 28.

Even when the optical axis of the range-finding light 5 entering the reflection surface 27 is tilted, most of the range-finding light 5 reflected by the reflection surface 27 enters the columnar optical member 29. It is repeatedly reflected within the columnar optical member 29 and is emitted toward the reflection surface 28. It can be designed in such manner that sufficient amount of communication light is guided toward the data communication unit 4 without designing the reflection surface 27 and 28 in larger size.

Figure 7:
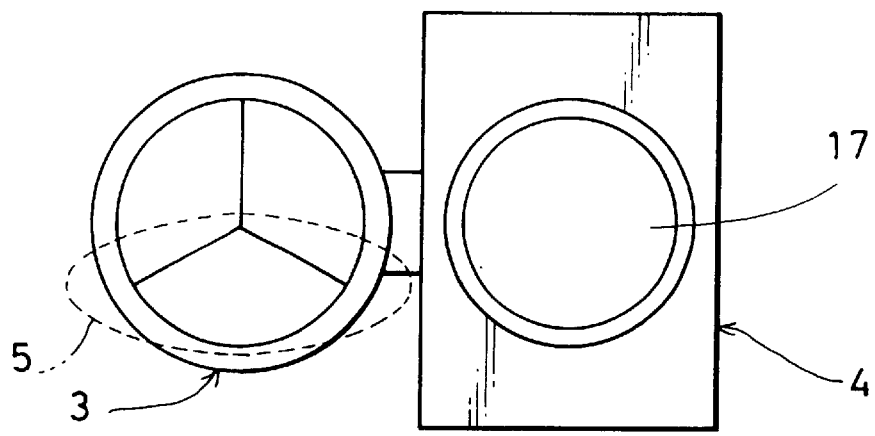
FIG. 7 is a drawing to show relationship of the prism unit with luminous fluxes of range-finding light in case the survey instrument and the reflective prism device are positioned at near distance.
Figure 11:
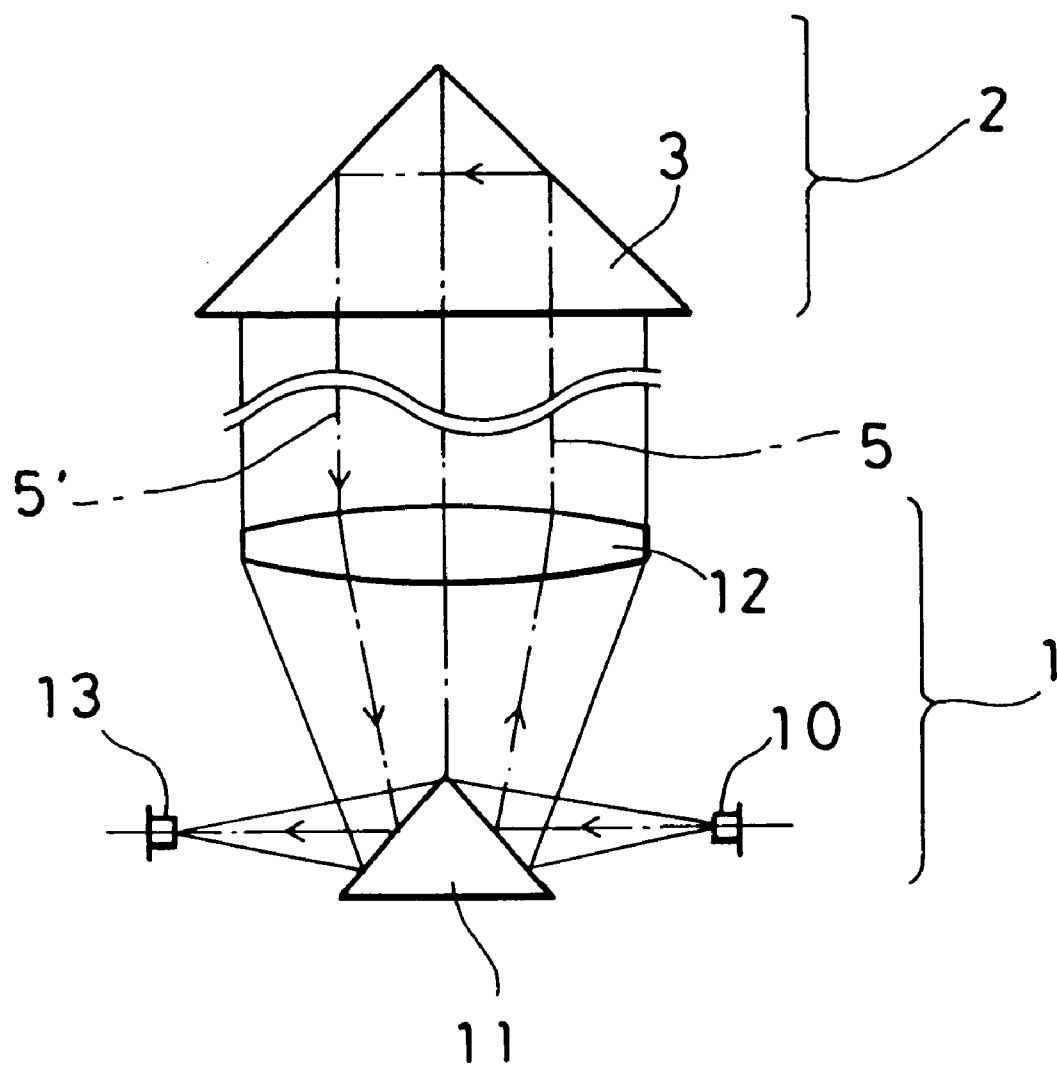
FIG. 11 shows a schematic optical arrangement of the survey instrument and the reflective prism device.

As briefly explained in connection with FIG. 11, exit and incidence of the range-finding light 5 are performed through a single objective lens 12. As a result, the exit beam and the incident beam are substantially separated to upper and lower components or to left and right components, and there is deviation in optical axis between outward course and return course of the range-finding light 5. In this respect, when the survey instrument 1 is positioned at near distance from the reflective prism device 2 and spreading of luminous fluxes of the range-finding light 5 is small, deviation of the range-finding light 5 in upper or lower direction or in leftward or right ward direction occurs. In survey operation, the center of the prism unit 3 is collimated. When the range-finding light 5 is emitted from lower portion of the objective lens 12, the range finding light 5 enters the lower half of the prism unit 3 as shown in FIG. 7.

Therefore, when the position of the reflection surface 27 of the light guide 26 is set at the center of the photodetection surface of the prism unit 3, there may be cases where the range-finding light 5 does not enter the light guide 26. For this reason, the reflection surface 27 of the light guide 26 is arranged at a position deviated downwardly from the center of the prism unit 3.

In survey operation, errors of angle measurement are offset, and inverse operation is performed in horizontality and height. When inverted, the range-finding light 5 is moved upward in FIG. 7. When inverse operation is performed, the light guide 26 cannot guide the range-finding light 5 toward the data communication unit 4 if it is at the original position. In this connection, the switching mechanism 25 rotatably supports the light guide 26 as described above in such manner that the light guide 26 can be held at two rotating positions by a holding power as required.

FIG. 8(A) and FIG. 8(B) each represents a position of the light guide 26 when inverse operation is performed during survey operation. By selecting the rotating position of the light guide 26, it is possible to guide the range-finding light 5 with a constant light amount, i.e. communication light, toward the data communication unit 4 regardless of the inverse operation.

Figure 9A:
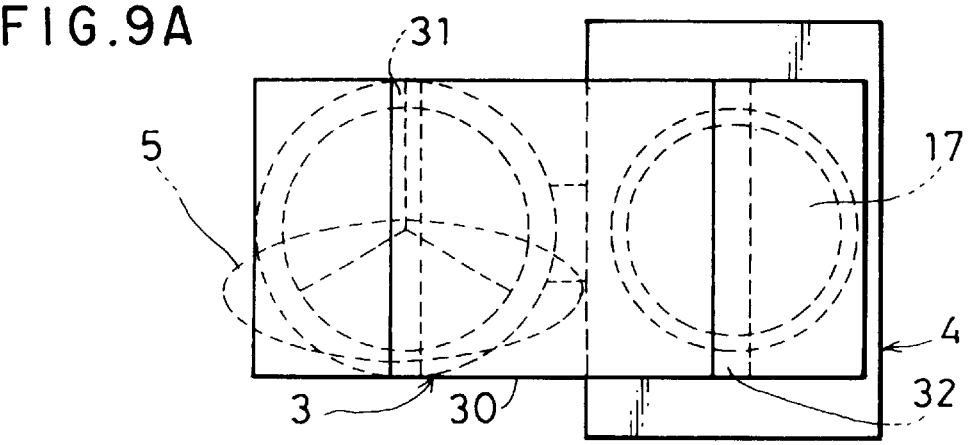
FIG. 9 shows another embodiment of the present invention, FIG. 9(A) showing a front view, and FIG. 9(B) showing a bottom view of the embodiment.
Figure 9B:
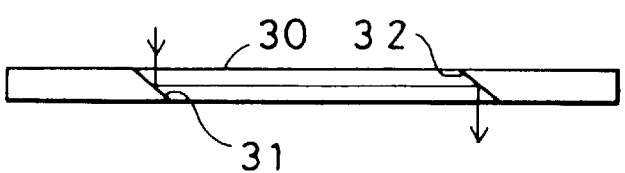

FIG. 9(A) and FIG. 9(B) each represents another embodiment of the invention.

In this embodiment, the light guide 30 is designed as a planar optical member.

A light guide 30 in rectangular planar shape having such size and the required thickness to cover the photodetection surface of the prism unit 3, and the photodetection surface of the data communication unit 4 is arranged in front of the prism unit 3 and the data communication unit 4. The light guide 30 has a reflection surface 31 crossing vertically at the center of the prism unit 3 and a reflection surface 32 crossing vertically at the center of the photodetection window 17 of the data communication unit 4.

In case luminous fluxes of the range-finding light 5 have larger spreading, the prism unit 3 and the photodetection window 17 are irradiated. Among the irradiated luminous fluxes, the components entering the reflection surface 31 are reflected by the reflection surface 31, and after passing through the light guide 30, these components are reflected by the reflection surface 32 and enter the photodetection window 17. The irradiated light components other than those entering the reflection surface 31 pass through the light guide 30 and enter the prism unit 3 and the photodetection window 17.

When luminous fluxes of the range-finding light 5 are small, the range-finding light 5 is irradiated only to the lower half of the prism unit 3 as shown in FIG. 9(A). Because the reflection surface 31 crosses the prism unit 3 vertically, a part of the range-finding light 5 is reliably guided toward the data communication unit 4. Further, because the light guide 30 itself has a function of the columnar optical member 29, loss of light is extremely low.

Further, even when inverse operation is performed and irradiating position of the range-finding light 5 is moved to upper half portion, no influence is exerted on the reflection because the reflection surface 31 crosses vertically.

Therefore, there is no need to provide such a mechanism to inverse the light guide 30.

In the above embodiment, the range-finding light 5 is used as the laser beam for data communication, while track light or a projection laser may be used for data communication. Further, besides the reflective prism device combined with a prism, the data communication unit may be used as a single unit or the data communication unit may be arranged on the survey instrument side.

According to the present invention, data communication using light as medium can be perfectly performed even when the reflective prism device and the survey instrument are positioned at near distance or at long distance from each other or even when incident optical axis is tilted with respect to the data communication unit.

What is claimed is:

1. A reflective prism device, comprising a prism unit and a data communication unit which are arranged in parallel, and communication light being irradiated from a survey instrument toward said prism unit, wherein there are provided a light guide for guiding a part of said communication light entering said prism unit toward said data communication unit and a switching mechanism for changing the photoreceiving position of said light guide and for guiding said communication light from different position of said prism unit toward said data communication unit.

2. A reflective prism device according to claim 1, wherein said data communication unit comprises at least a photodetection unit for receiving communication light and an operation unit which have a signal detection circuit for detecting communication data from said communication light based on a photodetection signal of said photodetection unit and a display unit for displaying said communication data detected by said signal detection circuit.

3. A reflective prism device according to claim 1, wherein said switching mechanism switches over photodetecting position of said light guide to at least the upper or lower position of said prism unit.

* * * * *